United States Patent Office 3,714,108
Patented Jan. 30, 1973

3,714,108
MIXTURES OF MOULD PARTING AGENTS FOR POLYAMIDE MOULDING COMPOSITIONS
Karl-Heinz Hermann and Kurt Schneider, Krefeld-Bockum, Germany, assignors to Farbenfabriken Bayer Aktiengesellschaft, Leverkusen, Germany
No Drawing. Filed Apr. 22, 1970, Ser. No. 30,937
Claims priority, application Germany, Apr. 26, 1969,
P 19 21 364.0
The portion of the term of the patent subsequent to Nov. 17, 1987, has been disclaimed
Int. Cl. C08g 51/38, 51/42; C08r 1/44
U.S. Cl. 260—31.4 R         8 Claims

ABSTRACT OF THE DISCLOSURE

Polyamide moulding materials which can be more easily removed from the mould are obtained by adding to the polyamides a combination consisting of (a) a mould parting agent A which has an emulsifying action and is compatible with the polyamide, and (b) a mould parting agent B which is incompatible with the polyamide.

POLYAMIDE MOULDING COMPOSITION

The invention relates to polyamide moulding materials which contain a mould parting agent consisting of two components which serves to facilitate removal of moulded polyamide articles from the mould.

It is known to add natural or synthetic waxes, fatty acid esters, fatty alcohols or their alkoxylation products, fatty acids or their alkali metal or alkaline earth metal salts, fatty acid nitriles, fatty acid amides or alkoxylated fatty amines to polyamides as mould parting agents.

All the polyamide moulding materials prepared with the known mould parting agents, however, have the disadvantage that if the moulded articles which are to be produced are very complicated, removal from the mould is not sufficiently reliable. In particular production of such complicated articles by an injection moulding process cannot be carried out with the desired short cycle times. In the industrial production of injection moulded polyamide articles, however, it is of great interest for economic reasons to keep the necessary moulding cycles as short as possible. There is a connection between the length of the moulding cycle and the ease with which removal from the mould can be achieved. Hence the quicker a moulded article can be removed from the mould after moulding and the smaller the forces required for this process, the shorter are the moulding cycles which can be achieved.

Furthermore, the permissible range of moulding pressures required for reliable injection moulding of polyamide hereinafter briefly termed the "operating pressure range" should be as wide as possible in order to ensure satisfactory processing even under widely different conditions of the apparatus.

It is an object of this invention to provide well demouldable injection mouldable high molecular weight linear polyamide compositions.

This object is accomplished by high molecular weight linear polyamide compositions comprising a polyamide material and of from 0.01 to 10% by weight based on the whole composition of a mould parting agent which is a mixture of (a) a mould parting agent A which has an emulsifying action and is compatible with the polyamide, and (b) a mould parting agent B which is incompatible with the polyamide.

Mould parting agents which are compatible with polyamides are understood to mean substances which owing to their chemical constitution either form a clear solution or a stable emulsion in a polyamide melt at a concentration of at least 1%. Such substances are generally compounds which have one or more fairly long alkyl radicals which contain of from at least 12 up to carbon atoms as well as a fairly large number of groups which render the substances soluble or emulsifiable in the polyamide melt, e.g. alcoholic and/or phenolic hydroxyl groups, ether groups, secondary and/or tertiary amino groups and/or amide groups.

Mould parting agents which are incompatible with polyamides are understood to mean substances which have little or no solubility in a polyamide melt and cannot be distributed homogeneously in it with formation of a stable emulsion. Such substances are generally compounds which although containing one or more fairly long alkyl radicals which contain of from at least 12 up to carbon atoms, do not contain or only contain too small a number of the groups which induce solubility or emulsifiability in the polyamide melt.

Examples of emulsifying mould parting agents A which are compatible with polyamides are alkoxylation products of fatty alcohols of the general formula

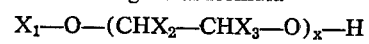

wherein $X_1$ represents a saturated or an unsaturated, preferably straight-chain alkyl radical containing at least 12 carbon atoms, $X_2$ represents a hydrogen atom or an alkyl radical containing 1–3 carbon atoms, $X_3$ represents a hydrogen atom or an alkyl radical containing 1–3 carbon atoms and $x$ represents an integer of 1–50;

alkoxylation products of fatty acids of the general formula

wherein $Y_1$ represents a saturated or an unsaturated, preferably straight chain, alkyl radical containing at least 12 carbon atoms, $Y_2$ represents a hydrogen atom or an alkyl radical containing 1–3 carbon atoms, $Y_3$ represents a hydrogen atom or an alkyl radical containing 1–3 carbon atoms and $x$ represents an integer of 1–50;

alkoxylation products of alkylphenols of the general formula

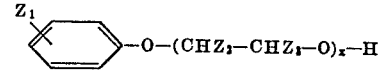

wherein $Z_1$ represents a saturated or an unsaturated alkyl radical containing at least 9 carbon atoms, $Z_2$ represents a hydrogen atom or an alkyl radical containing 1–3 carbon atoms, $Z_3$ represents a hydrogen atom or an alkyl radical containing 1–3 carbon atoms and $x$ represents an integer of 1–50;

alkoxylation products of fatty acid amides of the general formula

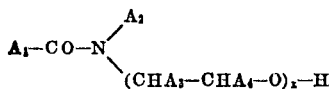

wherein $A_1$ represents a saturated or an unsaturated, preferably straight chain, alkyl radical containing at least 12 carbon atoms, $A_2$ represents a hydrogen atom, an optionally substituted alkyl, cycloalkyl, aryl or aralkyl radical or a radical of the formula $(CHA_3—CHA_4—O)_y—H$, $A_3$ represents a hydrogen atom or an alkyl radical containing 1–3 carbon atoms, $A_4$ represents a hydrogen atom or an alkyl radical containing 1–3 carbon atoms and $x$ is an integer of 1–50 and $y$, when present, is an integer so that $x+y$ is an integer from 2 to 50.

Preferably, however, alkoxylation products of fatty acid amines of the general formula

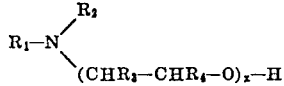

are used, wherein $R_1$ represents a saturated or an unsaturated, preferably straight chain alkyl radical containing at least 12 carbon atoms, $R_2$ represents a hydrogen atom, an optionally substituted alkyl, cycloalkyl, aryl or aralkyl radical or a radical of the formula $(CHR_3—CHR_4—O)_y—H$, $R_3$ represents a hydrogen atom or an alkyl radical containing 1–3 carbon atoms, $R_4$ represents a hydrogen atom or an alkyl radical containing 1–3 carbon atoms and $x$ is an integer of 1–50 and $y$, when present, is an integer so that $x+y$ is an integer from 2 to 50.

To illustrate the classes of compounds mentioned above, individual compounds are given below as examples of emulsifying mould parting agents which are compatible with polyamides; these are the alkoxylation products of

| Mol of— | Mols of— |
|---|---|
| 1, dodecylamine | 10, propylene oxide. |
| 1, hexadecylamine | 10, ethylene oxide. |
| 1, octadecylamine | Do. |
| Do | 5, propylene oxide. |
| Do | 20, ethylene oxide. |
| Do | 10, butylene oxide. |
| 1, N-methyl-octadecylamine | 10, ethylene oxide. |
| 1, N-cyclohexyl-octadecylamine | Do. |
| 1, N-cyanoethyl-octadecylamine | Do. |
| 1, N,N-bis-(octadecyl) amine | 20, ethylene oxide. |
| 1, eicosylamine | 10, ethylene oxide. |
| 1, hexadecyl alcohol | 5, propylene oxide. |
| 1, octadecyl alcohol | 10, ethylene oxide. |
| 1, palmitic acid | Do. |
| 1, stearic acid | 5, ethylene oxide. |
| Do | 10, propylene oxide. |
| Do | 20, propylene oxide. |
| 1, behenic acid | 10, ethylene oxide. |
| 1, oleic acid | Do. |
| 1, linoleic acid | Do. |
| 1, p-nonyl-phenol | 5, ethylene oxide. |
| Do | 30, ethylene oxide. |
| 1, m-pentadecyl-phenol | 20, propylene oxide. |
| Do | 10, ethylene oxide. |
| 1, p-dodecyl-phenol | 20, ethylene oxide. |
| 1, coconut fatty acid amide | 2, ethylene oxide. |
| 1, stearic acid amide | 5, ethylene oxide. |
| 1, stearic acid-N-methylamide | Do. |
| 1, behenic acid amide | 10, ethylene oxide. |
| 1, oleic acid amide | 5, ethylene oxide. |

Examples of mould parting agents B which are incompatible with polyamides are liquid or solid paraffins, polyethylene waxes having molecular weights of between about 2,000 and 12,000 and, preferably, esters of mono- or di-carboxylic acids and monofunctional alcohols of the general formula

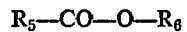

or

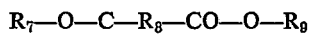

wherein $R_5$, $R_6$, $R_7$ and $R_9$, which may be the same or different, represent saturated or unsaturated alkyl radicals, cycloalkyl radicals, aryl radicals or aralkyl radicals, $R_8$ represents saturated or an unsaturated alkylene, cycloalkylene or arylene radical, wherein $R_5$ and/or $R_6$ and $R_7$ and/or $R_9$ contain at least 8 aliphatic carbon atoms linked together, e.g. butyl stearate, hexyl stearate, isodecylstearate, isononyl stearate, benzyl stearate, cyclohexyl stearate, isooctyl oleate, diisooctyl adipate, diisodecylsebacate, diisooctadecylisophthalate, methyl stearate, butyl palmitate, isononyl behenate, dodecyl acetate, dodecylbutyrate, isooctadecylbutyrate, isooctadecylbenzoate, n-octadecylbutyrate, n-octadecylstearate, isooctadecylstearate, isooctadecylbehenate, isooctadecyloleate, isooctadecyllinolate, diisooctadecyladipate, diisooctadecylsebacate, diisooctadecylterephthalate, di-n-octadecyl adipate, di-n-octadecyl sebacate, diisodecylphthalate, diisooctadecylphthalate, diisooctadecyl oxalate, diisooctadecylsuccinate, di-n-octadecyl-oxalate, diisononyl decandicarboxylate or diisooctadecyl decandicarboxylate, or esters of saturated or unsaturated aliphatic monocarboxylic acids having at least 12 carbon atoms and polylfunctional alcohols, e.g. hexane diol-bis-stearate, hexane triolmono-oleate, diethylene glycol bis-stearate, trimethylolpropane tris-palmitate, ethylene glycol bis-stearate, ethylene glycol bis-behenate, 2,2-dimethylpropane diol-bis-palmitate, 2,2-dimethyl-propanediol-bis-oleate, glycerol-tris-stearate, glycerol-tris-palmitate, glycerol-tri-behenate, glycerol-bis-behenate, trimethylolpropane-bis-behenate, pentaerythritol tetrakis-stearate, pentaerythritol-tris-behenate, pentaerythritol-bis-behenate, glycerol-monooleate-bis-stearate or trimethylolpropane-monooleate-monobehenate.

The total quantity of mould parting agents A and B added to the polyamides is 0.01 to 10% by weight, preferably 0.2 to 2.0% by weight, and the proportion by weight of compatible mould parting agent A to incompatible mould parting agent B may be between 1:10 and 10:1, preferably between 1:2 and 5:1.

It is another object of this invention to provide a process for the production of injection moulding high molecular weight linear polyamide compositions, which can easily be removed from the mould by the addition of 0.01 to 10% by weight based on the whole composition of a mould parting agent, which is a mixture of (a) at least one mould parting agent A which is compatible with and has an emulsifying action on the polyamide, and (b) at least one mould parting agent B which is incompatible with the polyamide, to a polyamide material.

The mould parting agents A and B may be added to the starting materials used to form the polyamide, after which polymerisation is carried out in known manner in batches, e.g. in autoclaves, or continuously, e.g. in precondensation pipes; if desired using water or compounds which split off water as catalysts or in the absence of water, using alkaline catalysts.

Preferably, however, the mould parting agents A and B are homogeneously distributed in the polyamides during or after batchwise polymerisation or polycondensation carried out e.g. in autoclaves or continuous polymerisation or polycondensation carried out e.g. in so-called "VK" pipes, using suitable mixing devices such as stirrers, kneaders or extruders. The mould parting agents added to the polyamide melts are in the form of a mixture which generally is either liquid at room temperature or can be made liquid by heating it to a temperature of between 20 and 100° C., the mixture being added by means of suitable dosing devices such as piston pumps, gear wheel pumps, flexible tube pumps and the like. Alternatively, the mould parting agents or mixtures thereof may be added to the polyamide melt in the form of a concentrate in that polyamide, using a suitable dosing device, e.g. a small extruder. In that case, the concentrate must previously be prepared separately. The polyamides according to the invention may be prepared by polymerisation or polycondensation of either aminocarboxylic acids or their lactams or of dicarboxylic acids and diamines.

In addition to mould parting agents, the polyamides may also contain the usual additives such as pigments, dyes, light and heat stabilisers, optical brightening agents, fillers such as kaolin, glass or asbestos fibres, plasticisers, substances which initiate crystallisation, chain breaking agents, etc.

It has been found, and is also clear from the experiments described in the example, that the combination of moulding parting agents A and B has a synergistic effect as regards removal of polyamide moulding compounds from the mould and enables injection moulding cycle times and a range of permissible moulding pressures to be obtained which are not obtainable when using mould parting agent A or B alone even if the quantity added were to be increased. Furthermore, only a very limited quantity of mould parting agent B which is incompatible with polyamides may be added if the moulded polyamide articles are to present a satisfactory surface.

The polyamide moulding materials according to the invention are eminently suitable for the production of parts of complicated shape which are difficult to remove from the mould in an injection moulding process. Examples of such products are moulded parts which have undercut portions, moulded articles which have numerous apertures formed by cores, and moulded articles which have a very high ratio of length/diameter, e.g. sleeves and hubs. Another advantage of the polyamide prepared according to the invention is that moulding temperatures of 120° C. and more can be employed without difficulties arising in the removal from the mould. The reason why this is an advantage is that moulded articles produced at higher moulding temperatures have a higher crystallinity and consequently have better mechanical properties, e.g. tensile strength and compressive strength, hardness and abrasion resistance than articles which have been produced at lower moulding temperatures in order to avoid difficulties in removing them from the mould.

The following example is to further illustrate the invention without limiting it.

EXAMPLE 1

Portions of 10 kg. of polycaprolactam having a relative viscosity of 2.80 (measured on a 1% solution in m-cresol at 25° C.) are homogeneously mixed in the form of granules with 1 g. of finely ground talcum and different mould parting agents by spinning and are then homogenised in a conventional extruder. The polyamide is extruded in the form of a wire having a diameter of about 3 mm., chopped up into a granulate, and dried. The products obtained in this way are worked up in a commercial injection extrusion machine manufactured by Maurer MH 80/120, employing the following conditions:

| | | |
|---|---|---|
| Diameter of cylinder | mm | 40 |
| Injection volume | cc | 70 |
| Injection pressure | | *25 |
| Temperature of the mass | ° C. | 250 |
| Nozzle temperature | ° C. | 240 |
| Moulding temperature | ° C. | 70 |

*Excess atmospheres (corresponding to a specific injection pressure of 300 kg. wt./cm.$^2$).

The mould used is designed to extrude 4 assembly unit type of blocks, one colour sample panel and 3 spirals for determining the flow length. The length of time of the individual extrusion process is so adjusted that automatic, trouble-free removal of the moulded parts is only just possible. This length of time constitutes the shortest moulding cycle.

In addition, the so-called processing pressure range is determined; this means the range of extrusion pressure from the minimum possible pressure which is just sufficient to fill the mould to the maximum possible pressure at which overinjection of the mould begins to occur. The processing pressure range should be as wide as possible in order to ensure reliable working up of the polyamide by the injection moulding process.

In addition, the moulded parts are assessed visually. In particular, they are inspected for flow marks and streaks due to incompatibility and inhomogeneity.

The results of these tests are summarised in the following table.

Tests Nos. 8 to 15 are comparison tests with known mould parting agents.

| Serial No. | Mould parting agent A, alkoxylation product of— | Percent | Mould parting agent B | Percent | Shortest moulding cycle in seconds | Processing pressure range | Surface |
|---|---|---|---|---|---|---|---|
| 1 | Octadecylamine and 10 ethylene oxide | 0.5 | Isononyl stearate | 0.5 | 6 | 8 | 36 Satisfactory. |
| 2 | do | 0.5 | Butyl stearate | 0.5 | 7 | 9 | 34 Do. |
| 3 | Octadecylamine and 15 ethylene oxide | 0.5 | Hexyl stearate | 0.5 | 6.5 | 9 | 34 Do. |
| 4 | do | 0.5 | Diisodecyladipate | 0.5 | 7.5 | 9.5 | 34 Do. |
| 5 | Coconut fatty acid amide and 2 ethylene oxide | 0.5 | Isononyl stearate | 0.5 | 7 | 9 | 32 Do. |
| 6 | p-Nonylphenol and 20 ethylene oxide | 0.5 | do | 0.5 | 8 | 10 | 33 Do. |
| 7 | Behenic acid and 10 ethylene oxide | 0.5 | do | 0.5 | 7 | 8.5 | 33 Do. |
| 8 | Octadecylamine and 10 ethylene oxide | 0.5 | | | 12 | 13 | 25 Do. |
| 9 | do | 1.0 | | | 11 | 13 | 27 Do. |
| 10 | | | Isononyl stearate | 0.5 | 12 | 13 | 27 Do. |
| 11 | | | do | 1.0 | 9.5 | 11 | 29 Inhomogeneous (streaky). |
| 12 | Coconut fatty acid amide and 2 ethylene oxide | 0.5 | | | 14 | 14 | 25 Satisfactory. |
| 13 | do | 1.0 | | | 13 | 12 | 25 Do. |
| 14 | Behenic acid and 10 ethylene oxide | 0.5 | | | 13 | 12.5 | 26 Do. |
| 15 | do | 1.0 | | | 11.5 | 12 | 26 Do. |

What we claim is:

1. A polyamide molding composition which comprises a high molecular weight linear polyamide and 0.01 to 10% by weight, based on the weight of the whole composition of a mold parting agent which is a mixture of (a) at least one mold parting agent A which is compatible with and has an emulsifying action on said polyamide and is selected from the class consisting of (1) 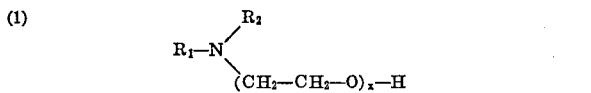

and (2) 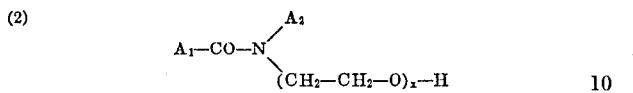

wherein
$R_1$ is a saturated alkyl radical selected from the group consisting of dodecyl, hexadecyl and octadecyl,
$R_2$ is selected from the group consisting of a hydrogen atom, methyl and a radical
$$-(CH_2-CH_2-O)_y-H$$
$A_1$ is a saturated or an unsaturated straight chain alkyl radical containing at least 12 carbon atoms,
$A_2$ is selected from the group consisting of a hydrogen atom and a radical
$$-(CH_2-CH_2-O)_y-H$$
$x$ is an integer from 1 to 50 and
$y$ when present, is an integer so that $x+y$ is an integer from 2 to 50, and
(b) at least one mold parting agent B which is incompatible with said polyamide and is selected from the class consisting of (3) $\quad R_5COOR_6$ (4) $\quad R_7-O-CO-R_8-CO-O-R_9$ and (5) an ester of a saturated or unsaturated aliphatic monocarboxylic acid having at least 12 carbon atoms and a polyfunctional alcohol
wherein
$R_4$, $R_5$, $R_7$ and $R_9$, which may be the same or different, are selected from the group consisting of a saturated alkyl, an unsaturated alkyl radical, a cycloalkyl radical, an aryl radical and an aralkyl radical,
$R_8$ is selected from the group consisting of a saturated alkylene radical, an unsaturated alkylene radical, a cycloalkylene radical, and an arylene radical,
$R_5$ and/or $R_6$ and $R_7$ and/or $R_9$ containing at least 9 aliphatically linked carbon atoms, the proportion by weight of mold parting agent A to mold parting agent B being between 1:10 and 10:1.

2. A process for the production of well demoldable high molecular weight linear polyamide molding compositions which comprises adding 0.01 to 10% by weight, based on the weight of the whole composition of a mold parting agent which is a mixture of
(a) at least one mold parting agent A which is compatible with and has an emulsifying action on said polyamide and is selected from the class consisting of (1) 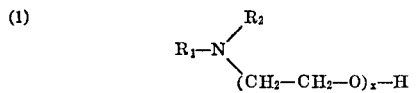

and (2) 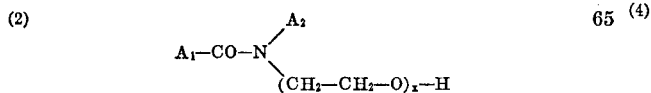

wherein
$R_1$ is a saturated alkyl radical selected from the group consisting of dodecyl, hexadecyl and octadecyl,
$R_2$ is selected from the group consisting of a hydrogen atom, methyl and a radical
$$-(CH_2-CH_2-O)_y-H$$

$A_1$ is a saturated or an unsaturated straight chain alkyl radical containing at least 12 carbon atoms,
$A_2$ is selected from the group consisting of a hydrogen atom and a radical
$$-(CH_2-CH_2-O)_y-H$$
$x$ is an integer from 1 to 50 and
$y$ when present, is an integer so that $x+y$ is an integer from 2 to 50, and
(b) at least one mold parting agent B which is incompatible with said polyamide and is selected from the class consisting of (3) $\quad R_5COOR_6$ (4) $\quad R_7-O-CO-R_8-CO-O-R_9$ and (5) an ester of a saturated or unsaturated aliphatic monocarboxylic acid having at least 12 carbon atoms and a polyfunctional alcohol
wherein
$R_5$, $R_6$, $R_7$ and $R_9$, which may be the same different, are selected from the group conconsisting of a saturated alkyl, an unsaturated alkyl radical, a cycloalkyl radical, an aryl radical and an aralkyl radical,
$R_8$ is selected from the group consisting of a saturated alkylene radical, an unsaturated alkylene radical, a cycloalkylene radical, and an arylene radical,
$R_5$ and/or $R_6$ and $R_7$ and/or $R_9$ containing at least 8 aliphatically linked carbon atoms, the proportion by weight of mold parting agent A to mold parting agent B being between 1:10 and 10:1.

3. A polyamide molding composition which comprises a high molecular weight linear polyamide and 0.01 to 10% by weight, based on the weight of the whole composition, of a mold parting agent which is a mixture of
(a) at least one mold parting agent A which is compatible with and has an emulsifying action on said polyamide, and is selected from the class consisting of (1) 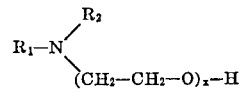

where
$R_1$ is octadecyl
$R_2$ is H or $-(CH_2-CH_2-O)_y-H$ (2) $\quad Y_1-CO-O-(CH_2-CH_2-O)_x-H$ where
$Y_1$ is heneicosyl (3) 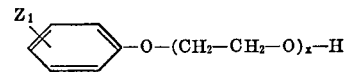

where
$Z_1$ is nonyl
and (4) 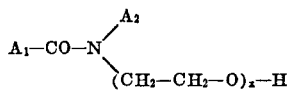

where
$A_1-CO-N<$ is the radical from coconut fatty acid amide and
$A_2$ is H or $-(CH_2-CH_2-O)_y-H$
$x$ is an integer from 1 to 50, and
$y$, when present, is an integer so that $x+y$ is an integer from 2 to 50, and (b) at least one mold parting agent B which is incompatible with said polyamide and is selected from the class consisting of (5) $R_5$—CO—O—$R_6$, and (6) $R_7$—O—CO—$R_8$—CO—O—$R_9$ wherein
$R_5$ is heptadecyl;
$R_6$ is selected from the group butyl, hexyl and isononyl;
$R_7$ and $R_9$ are isodecyl and
$R_8$ is butylene.

where the weight proportion of A to B is between 1:10 and 10:1.

4. A process for the production of well demoldable high molecular weight linear polyamide molding compositions which comprises adding 0.01 to 10% by weight based on the whole composition of a mold parting agent to a polyamide material wherein said mold parting agent is a mixture of (a) at least one mold parting agent A which is compatible with and has an emulsifying action on said polyamide, and is selected from the class consisting of (1) 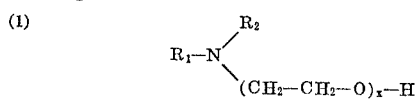

where
$R_1$ is octadecyl,
$R_2$ is H or —$(CH_2$—$CH_2$—$O)_y$—H, (2) $Y_1$—CO—O—$(CH_2$—$CH_2$—$O)_x$—H where
$Y_1$ is heneicosyl, (3) 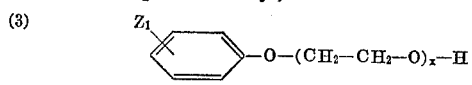

where
$Z_1$ is nonyl, and (4) 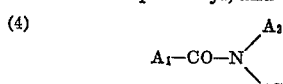

$A_1$—CO—N< is the radical from coconut fatty acid amide $A_2$ is H or —$(CH_2$—$CH_2$—$O)_y$—H
$x$ is an integer from 1 to 50, and
$y$, when present, is an integer so that $x+y$ is an integer from 2 to 50, and (b) at least one mold parting agent B which is incompatible with said polyamide and is selected from the class consisting of (5) $R_5$—CO—O—$R_6$, and (6) $R_7$—O—CO—$R_8$—CO—O—$R_9$ wherein
$R_5$ is heptadecyl;
$R_6$ is selected from the group butyl, hexyl and isononyl;
$R_7$ and $R_9$ are isodecyl and $R_8$ is butylene where the weight proportion of A to B is between 1:10 and 10:1.

5. The composition as claimed in claim 1, in which 0.2 to 2.0% by weight of the mould parting agent is present in the composition.

6. Moulded polyamide articles produced from a composition as claimed in claim 1.

7. The process as claimed in claim 2, wherein said polyamide material is a polyamide melt.

8. The process as claimed in claim 2, wherein said polyamide material is a polyamide-forming starting material.

References Cited

UNITED STATES PATENTS

| | | | |
|---|---|---|---|
| 3,557,132 | 1/1971 | Hermann et al. | 260—302 |
| 3,008,908 | 11/1961 | Lodewijk | 260—18 |
| 3,262,989 | 7/1966 | Brignac | 260—857 |
| 3,461,092 | 8/1969 | Story | 260—28 |
| 3,516,957 | 6/1970 | Gray | 260—22 |
| 3,541,041 | 11/1970 | Hermann | 260—32.6 |

FOREIGN PATENTS 940,650      Great Britain.

MORRIS LIEBMAN, Primary Examiner

R. ZAITLEN, Assistant Examiner

U.S. Cl. X.R.

260—31.2 N, 31.8 N

UNITED STATES PATENT OFFICE
CERTIFICATE OF CORRECTION

Patent No. 3,714,108  Dated January 30, 1973

Inventor(s) Karl-Heinz Hermann et al

It is certified that error appears in the above-identified patent and that said Letters Patent are hereby corrected as shown below:

Column 7, line 48 in Claim 1 -- "9" should read ---8---.

Column 9, line 45 in Claim 4, -- Before "$A_1$-CO-N" insert the word ---where---.

Signed and sealed this 19th day of November 1974.

(SEAL)
Attest:

McCOY M. GIBSON JR.
Attesting Officer

C. MARSHALL DANN
Commissioner of Patents